(12) United States Patent
Kawanabe et al.

(10) Patent No.: US 7,949,161 B2
(45) Date of Patent: May 24, 2011

(54) MICROSCOPE SYSTEM AND METHOD FOR SYNTHESIZING MICROSCOPIC IMAGES

(75) Inventors: Hideyuki Kawanabe, Tokyo (JP); Takashi Yoneyama, Sagamihara (JP); Tetsuya Shirota, Tokyo (JP)

(73) Assignee: Olympus Corporation, Tokyo (JP)

( * ) Notice: Subject to any disclaimer, the term of this patent is extended or adjusted under 35 U.S.C. 154(b) by 1048 days.

(21) Appl. No.: 11/801,697

(22) Filed: May 10, 2007

(65) Prior Publication Data

US 2007/0285768 A1 Dec. 13, 2007

(30) Foreign Application Priority Data

May 24, 2006 (JP) ................... 2006-144657

(51) Int. Cl.
*G06K 9/00* (2006.01)
(52) U.S. Cl. ........................ 382/128; 359/372
(58) Field of Classification Search ................... 382/128
See application file for complete search history.

(56) References Cited

U.S. PATENT DOCUMENTS

| 2004/0119817 A1* | 6/2004 | Maddison et al. ............... 348/79 |
| 2006/0018013 A1 | 1/2006 | Suzuki et al. |
| 2006/0045388 A1 | 3/2006 | Zeineh et al. |
| 2007/0121198 A1 | 5/2007 | Suzuki et al. |
| 2007/0285769 A1 | 12/2007 | Shirota et al. |

FOREIGN PATENT DOCUMENTS

| EP | 1 324 097 A2 | 7/2003 |
| JP | 7-333522 A | 12/1995 |
| JP | 2002-014288 A | 1/2002 |
| JP | 2004-309768 A | 11/2004 |
| WO | WO 01/27679 A1 | 4/2001 |

OTHER PUBLICATIONS

Suzuki, English-version of JP-2004-309768, the translation was made by machine.*
U.S. Appl. No. 11/801,694; First Named Inventor: Tetsuya Shirota; Title: "Microscope system and method for synthesizing microscopic images"; filed May 10, 2007.

* cited by examiner

*Primary Examiner* — Samir A Ahmed
*Assistant Examiner* — Ruiping Li
(74) *Attorney, Agent, or Firm* — Holtz, Holtz, Goodman & Chick, PC

(57) ABSTRACT

An obtainment unit obtains microscopic images in a time series obtained by picking up images of a specimen as a motion image and also obtains microscope information that is information correlated with each of the microscopic images and the information that indicates an observation state of the microscope when the microscopic image has been picked up. An image synthesis unit synthesizes individual microscopic images constituting the motion image based on position information which is included in the microscope information and which indicate positions of the specimen when the microscopic image has been picked up, thereby synthesizing a wider view image than the microscopic image.

10 Claims, 13 Drawing Sheets

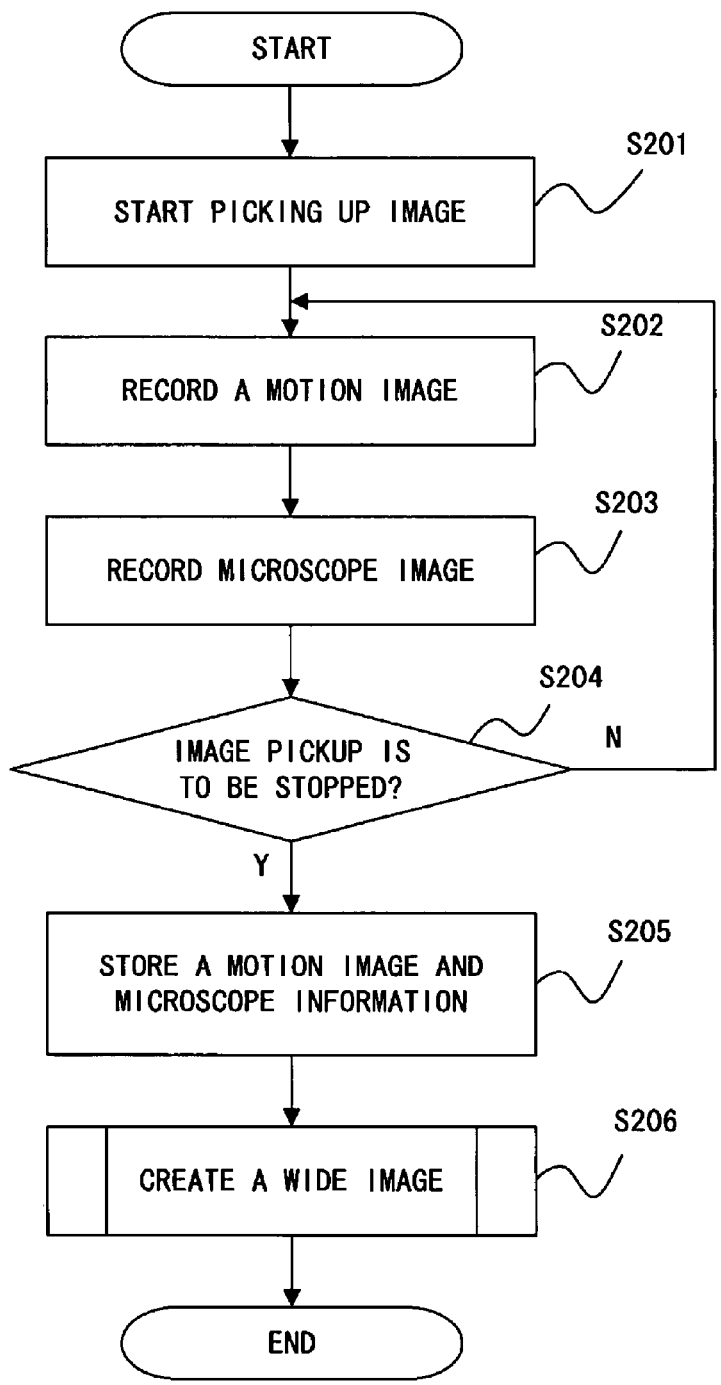
F I G. 2

| Frame No | X COORDINATE | Y COORDINATE | Z COORDINATE | MAGNIFICATION | ILLUMINATION LIGHT VOLUME | OBSERVATION METHOD |
|---|---|---|---|---|---|---|
| 1 | 5000 | 4000 | 3400 | 10 | 60 | BRIGHT FIELD |
| 2 | 5500 | 4500 | 3400 | 10 | 60 | BRIGHT FIELD |
| 3 | 6000 | 5000 | 3400 | 10 | 60 | BRIGHT FIELD |
| 4 | 6500 | 5500 | 3400 | 10 | 60 | BRIGHT FIELD |
| 5 | 7000 | 6000 | 3400 | 10 | 60 | BRIGHT FIELD |

FIG. 3

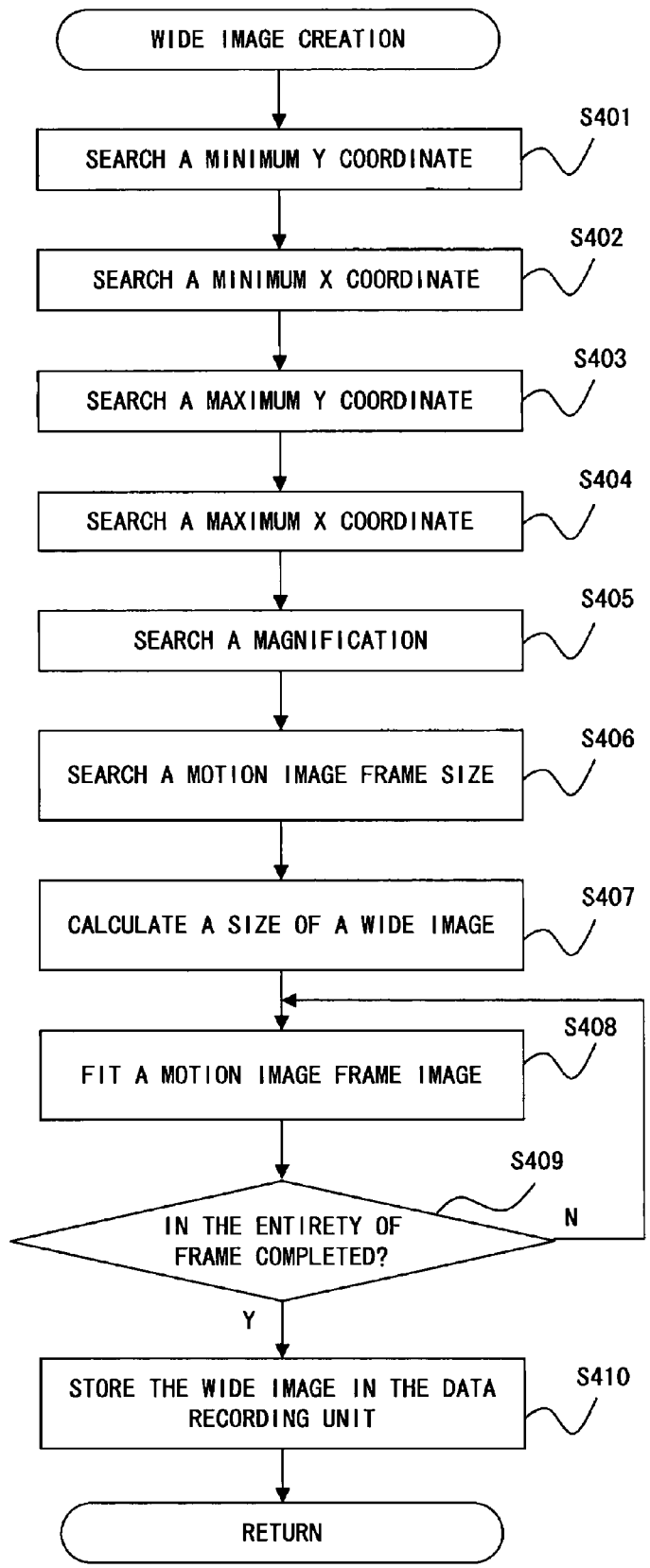
F I G. 4

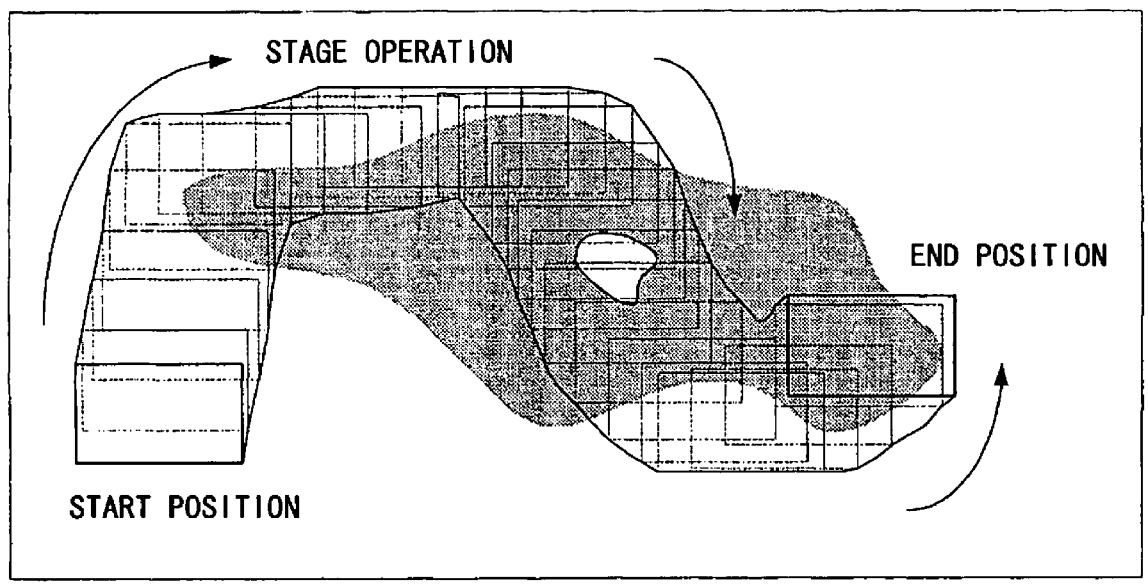
F I G. 6 A

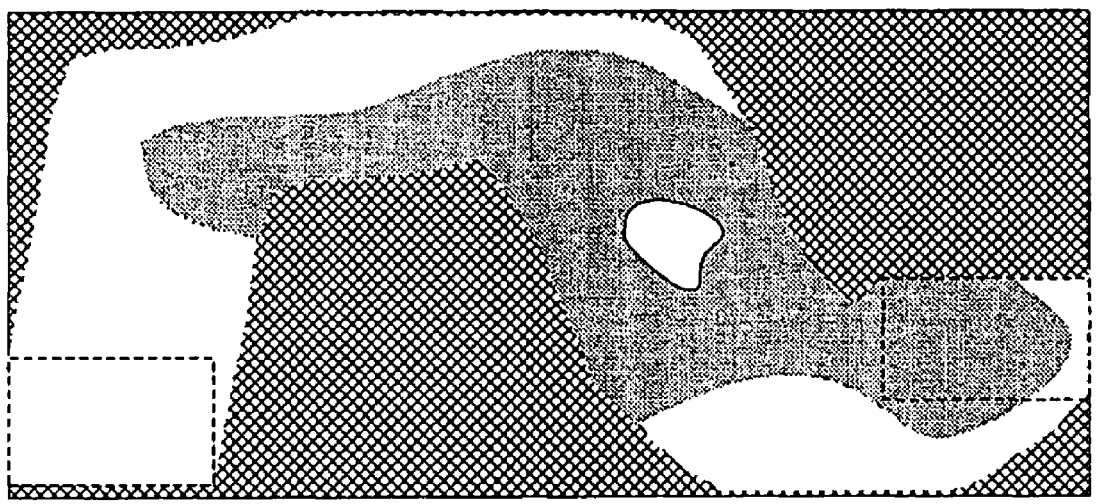
 UN-OBTAINED ZONE
F I G. 6 B

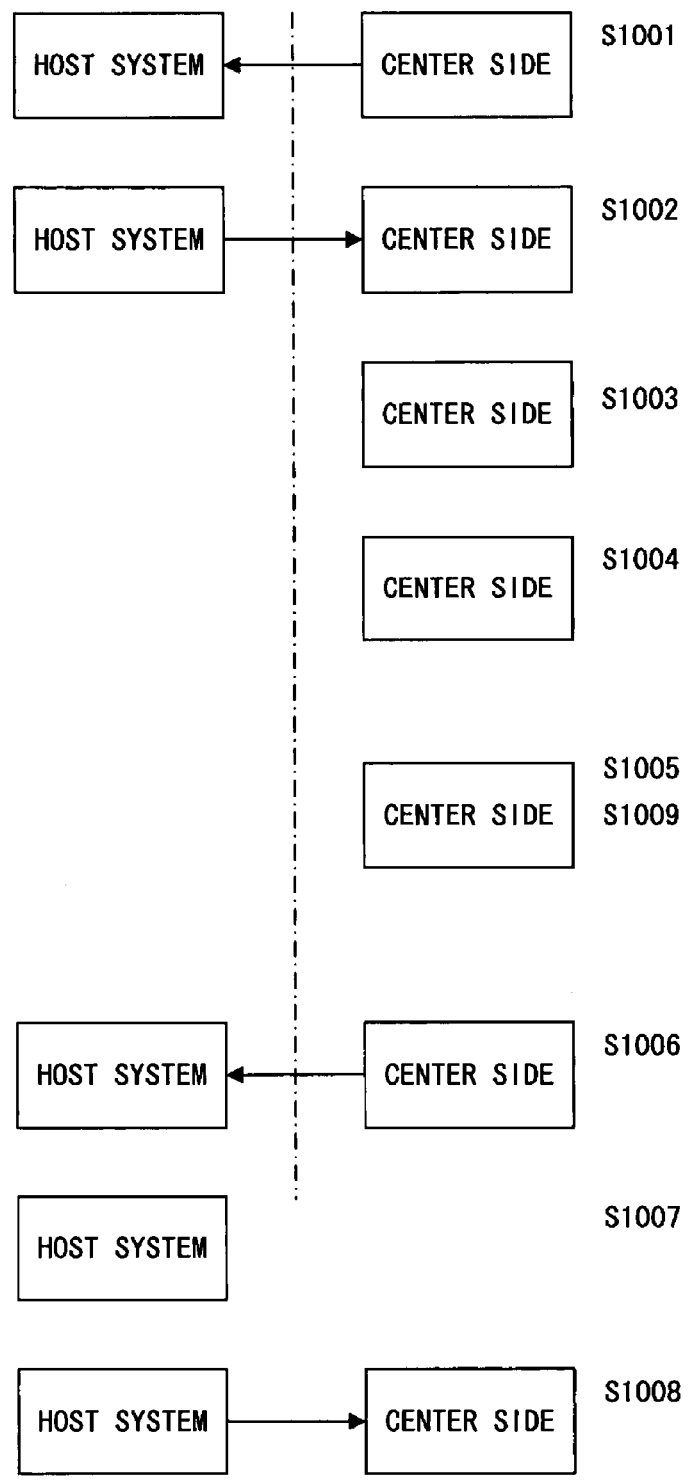
F I G. 1 0 B

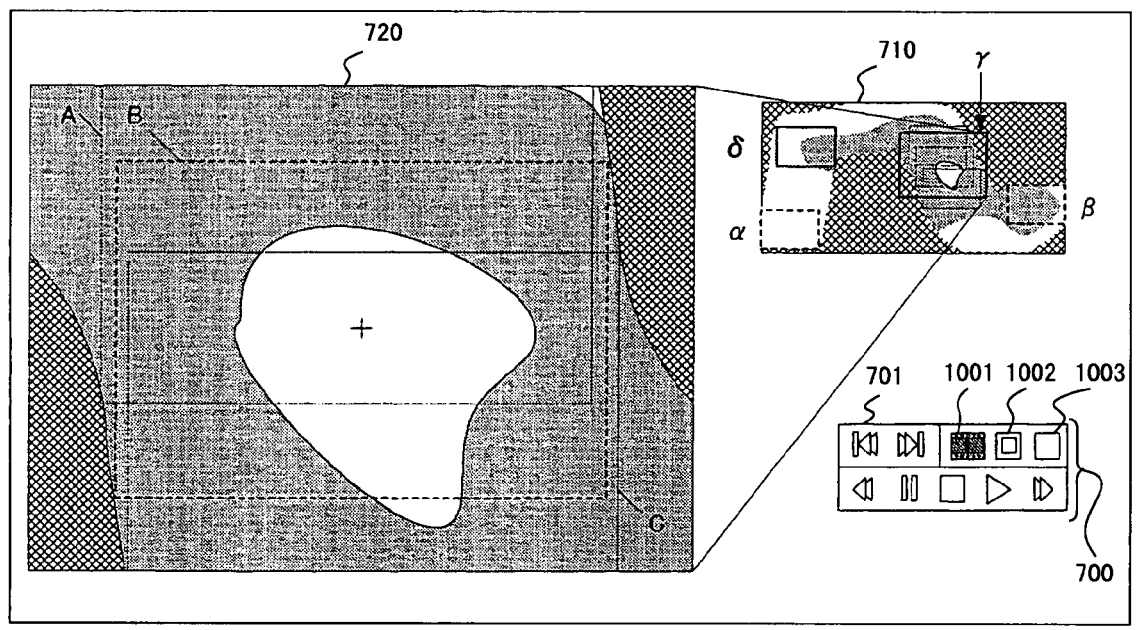
F I G. 11

MICROSCOPE SYSTEM AND METHOD FOR SYNTHESIZING MICROSCOPIC IMAGES

CROSS REFERENCE TO RELATED APPLICATIONS

This application claims benefit of Japanese Application No. 2006-144657, filed May 24, 2006, the contents of which are incorporated by this reference.

BACKGROUND OF THE INVENTION

1. Field of the Invention

The present invention relates to a technique used for a microscope and in particular to a technique for alleviating a workload required for an observation by using a microscope.

2. Description of the Related Art

Microscopes are widely used for researches, examinations, et cetera, in the fields of biology and industry. In an examination carried out by using a microscope, commonly exercised is to provide a plurality of object lenses with different magnification ratios and observe an observed specimen by moving a motorized stage for moving the specimen within a plane perpendicular to an observation light path from the direction of an object lens. In such an observation, a screening is carried out by setting an object lens at low magnification ratio so as to cover the entirety of the observed specimen. Then, it is followed by returning to a point in which an abnormality has been discovered and that for which a recording is desired in the observation specimen, examining these points in details by changing over to an object lens of a higher magnification ratio and recording the observation data.

As an example related to a microscope suitable to such an observation, a Laid-Open Japanese Patent Application Publication No. 07-333522 has disclosed a microscopic image remote observation apparatus enabling an observation by displaying an image of an attention region in a motion image on one hand and, on the other, an image of the peripheral region including the aforementioned attention region, in a still image.

And, as another example, a Laid-Open Japanese Patent Application Publication No. 2004-309768 has disclosed a microscope system capable of reproducing a setup state of each part without repeating a cumbersome adjustment work.

In order to return to the point of which an observation record needs to be saved by a use of an object lens of a high magnification ratio in the observation specimen after carrying out a screening observation with the object lens of a low magnification ratio in the screening process as described above, the point needs to be searched by operating the microscope system again. If a point in need of recording is selected because a plurality of such points exists, the operation of the microscope gives a large amount of load on the operator. Meanwhile, a screening observation of the entirety of the specimen carried out by an object lens of a low magnification ratio needs to be scanned for the entire area of the specimen for preventing a missed region of observation, and therefore it makes a work requiring a large length of time. Moreover, if a quick decision is required or a large amount of specimens is required to observe at once, a capability of recording the point quickly and easily is very important.

SUMMARY OF THE INVENTION

A microscope system according to one aspect of the present invention comprises an obtainment unit for obtaining microscopic images in a time series obtained by picking up images of a specimen as a motion image and also obtaining microscope information that is information correlated with each of the microscopic images and the information that indicates an observation state of the microscope when the microscopic image has been picked up; and an image synthesis unit for synthesizing individual microscopic images constituting the motion image based on position information which is included in the microscope information and which indicate positions of the specimen when the microscopic image has been picked up, thereby synthesizing a wider view image than the microscopic image.

A method for synthesizing microscopic images according to another aspect of the present invention comprises obtaining microscopic images in a time series obtained by picking up images of a specimen as a motion image and also obtaining microscope information that is information correlated with each of the microscopic images and the information that indicates an observation state of the microscope when the microscopic image has been picked up; and synthesizing individual microscopic images constituting the motion image based on position information which is included in the microscope information and which indicate positions of the specimen when the microscopic image has been picked up, thereby synthesizing a wider view image than the microscopic image.

BRIEF DESCRIPTION OF THE DRAWINGS

The present invention will be more apparent from the following detailed description when the accompanying drawings are referenced.

FIG. 2 is a diagram showing a process content of a control process carried out by a host system shown in FIG. 1;

FIG. 3 is a diagram exemplifying microscope information;

FIG. 4 is a diagram showing a process content of a wide image creation process by a flow chart;

FIG. 6A is a diagram showing an illustration diagram exemplifying the entirety of a specimen and a locus when a motorized stage is moved while recording the specimen as a motion image;

FIG. 6B is a diagram exemplifying a wide image created from a motion image;

FIG. 10B is a diagram showing each process step shown in FIG. 10A being carried out by either of the host system side or center side shown in FIG. 9; and FIG. 11 is a diagram exemplifying a search for a motion image frame expressing an image area of the closest position to the center position in a partial area display of a wide image displayed in an enlarged replay display part.

DESCRIPTION OF THE PREFERRED EMBODIMENTS

The following is a description of the preferred embodiment of the present invention by referring to the accompanying drawings.

Embodiment 1

Figure 1:
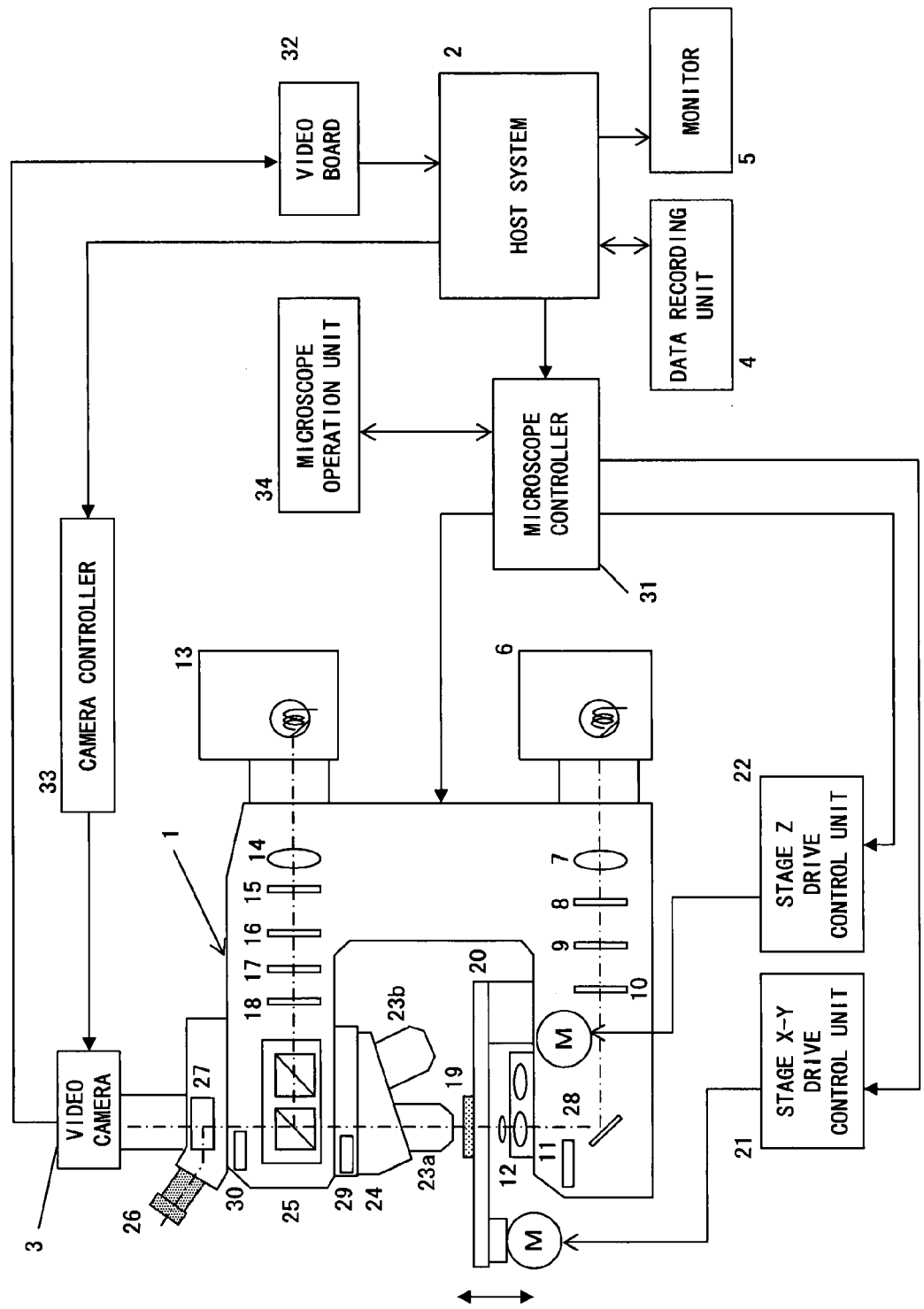
FIG. 1 is a diagram showing a configuration of a microscope system according to an embodiment 1.

FIG. 1 is a diagram showing a configuration of a microscope system according to the present embodiment.

Referring to FIG. 1, a host system 2 connected to a microscope apparatus 1 controls it and also records motion image data of a specimen 19, an observation state of the microscope apparatus 1 and coordinates of the specimen by synchronizing the three of them. A video camera 3 photographs a microscopic image of the specimen 19 obtained by using the microscope apparatus 1. A monitor 5 connected to the host system 2 displays various images.

The microscope apparatus 1 comprises a transmission observation-use optical system and an incident-light observation optical system. Here, comprised in the microscope apparatus 1 as the transmission observation-use optical system are a transmission illumination-use light source 6, a collector lens 7 for condensing the illumination light thereof, a transmissive filter unit 8, a transmission visual field aperture 9, a transmission aperture stop 10, a condenser optical element unit 11, and a top lens unit 12. Meanwhile, comprised in the microscope apparatus 1 as the incident-light observation optical system are an incident-light illumination-use light source 13, a collector lens 14 for condensing the illumination light thereof, an incident-light-use filter unit 15, an incident-light shutter 16, an incident-light visual field aperture 17 and an incident-light aperture stop 18.

A motorized stage 20 on which the specimen 19 is placed and which is freely movable in either of the up, down, left and right directions is equipped in an observation light path where the light path of the transmission observation-use optical system overlaps with that of the incident-light observation optical system. A movement of the motorized stage 20 is controlled by a stage X-Y drive control unit 21 and a stage Z drive control unit 22. Note that the motorized stage 20 comprises an origin detection function by means of an origin sensor (not shown in a drawing herein), thereby enabling a movement control of the specimen 19 placed on the motorized stage 20 by a coordinate detection and a coordinate designation.

Also comprised in the observation light path are a revolver 24, a cube unit 25 and a beam splitter 27. Here, the revolver 24 is used for selecting an object lens used for an observation from among the object lenses 23a, 23b and so on (generically named as "object lens 23" as appropriate hereinafter) by a revolving operation. The cube unit 25 is used for changing over the microscopy. The beam splitter 27 is used for splitting an observation light path between the sides of an eye piece lens 26 and a video camera 3.

Meanwhile, a polarizer 28, a Differential Interference Contrast (DIC) prism 29 and an analyzer 30 are comprised for observing a differential interference, making it possible to insert them into the observation light path on an as required basis. Note that these individual units are motorized and the operations are controlled by a microscope controller 31.

The microscope controller 31 connected to the host system 2 has the function as microscope control means for controlling operations of the entirety of the microscope apparatus 1. That is, the microscope controller 31 changes the microscopy and adjusts the brightness of the transmission illumination-use light source 6 and incident-light illumination-use light source 13 in accordance with a control signal from the host system 2 in addition to carrying out the control as described above. The microscope controller 31 also has the function of notifying the host system 2 of the current microscopic examination state of the microscope apparatus 1. Furthermore, the microscope controller 31 is connected to the stage X-Y drive control unit 21 and stage Z drive control unit 22, and therefore the motorized stage 20 can be controller from the host system 2.

A microscope operation unit 34 is a hand switch comprising various input units for obtaining an input of an instruction for operating the microscope apparatus 1 as input of a series separate from the host system 2. The hand switch comprises a joy stick or encoder (not shown in a drawing herein) for example, making it possible to operate the motorized stage 20 by operating these.

A microscopic image of the specimen 19 picked up by the video camera 3 is imported to the host system 2 by way of a video board 32. The host system 2 is capable of carrying out the on/off and gain setup of an automatic gain control, and the on/off of an automatic exposure control and a setup of exposure time by way of a camera controller 33. The host system 2 is also capable of storing a microscopic image of the specimen 19 sent from the video camera 3 as motion image data and still image data in a data recording unit 4. The motion image data and still image data recorded in a data recording unit 4 can be read by the host system 2 and displayed by the monitor 5 that is an image display unit.

Moreover, the host system 2 provides a so-called video auto focus (AF) function that is a focusing operation based on a contrast of a microscopic image picked up by the video camera 3.

Note that the host system 2, being just a standard configuration computer, comprises a central processing unit (CPU) for managing an operation control of the entirety of the microscope system by executing a control program; main memory used by the CPU as work memory on an as required basis; an input unit, such as mouse and key board, for obtaining various instructions from a user; an interface unit for managing an exchange of various data between the individual constituent components of the microscope system; and an auxiliary storage apparatus, such as a hard disk apparatus, for storing various programs and data.

The next is a description of an operation of the microscope system.

FIG. 2 is a diagram showing a process content of a control process carried out by the host system 2 shown in FIG. 1. The process is implemented by the CPU of the host system 2 executing a prescribed control program. The process is started when the host system 2 obtains an instruction issued from a user of the microscope system 1 shown in FIG. 1 for starting to pick up image of the specimen 19.

Referring to FIG. 2, the first process is to start picking up a microscopic image of the specimen 19 by controlling the video camera 3 by way of the camera controller 33 in (the step) S201. A repetition of the process of S202 through S204 carries out a video recording of a motion image of the specimen 19.

The process in S202 is to obtain microscopic images, in a time series, of the specimen 19 picked up by the video camera 3 as a motion image by way of the video board 32 and record the obtained microscopic images in a time series as data of a motion image temporarily within the host system 2.

Then a microscope information recording process is carried out in S203. This process first obtains, by way of the microscope controller 31, microscope information that indicates the current observation state (i.e., an observation state at the time of obtaining a microscopic image) of the microscope system 1, including coordinates data of the XY coordinates and Z coordinate of the motorized stage 20 indicating the current position of the specimen 19, for each of the microscopic images constituting a motion image. Then, the obtained microscope information is temporarily recorded within the host system 2 by correlating with each microscopic image. Therefore, 30 sets of microscope information are obtained per second if the frame rate of a motion image is 30 frames per second.

FIG. 3 exemplifies the microscope information. The table in FIG. 3 shows magnification ratio information of a microscopic image, light volume information of an illumination light and information of an observation method (i.e., the microscopy) along with values of X, Y and Z coordinates of the motorized stage 20 that are utilized as position information indicating a position of the specimen 19.

Note that the microscope information may use information indicating a category of a filter or that of a cube used at the time of obtaining the microscopic image. Also, various pieces of information, such as one indicating a category of an inserted neutral density (ND) filter, may be added as microscope information in addition to the light volume information of an illumination light.

Now the description returns to FIG. 2.

Having made a recording of a motion image started, the user makes the motorized stage 20 moved by operating a joy stick (not shown in a drawing herein) or such comprised in the microscope operation unit 34 while looking at an observation image of the specimen 19 and observes a discretionary place thereof (i.e., a screening). During this period of time, the microscopic image of the specimen 19 is recorded as a motion image and also the microscope information indicating an observation state of the microscope apparatus 1 at the time of obtaining each microscopic image is recorded.

Then, a process of judging whether or not an instruction to stop picking up image of the observed image 19, which is issued by the user as a result of completing the observation of the specimen, has been received in S204. Here, if the judgment is that an image pickup stop instruction is received (i.e., the judgment result is "yes"), the process shifts to S205. Contrarily, if the judgment is that an image pickup stop instruction is not yet received (i.e., the judgment result is "no"), the process returns to the S202 for continuing recording of a motion image of the specimen 19.

In S205, a process is carried out for recording and storing data of a motion image which has been recorded within the host system 2 by the above described process and microscope information correlated with each microscopic image constituting the aforementioned motion image in the data recording unit 4.

In S206, a wide image creation process (to be described next) is carried out, followed by ending the control process shown in FIG. 2.

The description now turns to FIG. 4 that shows a process content of a wide image creation process, which is the process of S206 of FIG. 2, by a flow chart. This process is for creating a wide image showing the entire image of the specimen 19 based on motion image data of the specimen 19 stored in the data storage unit 4 and microscope information correlated with each microscopic image constituting the aforementioned motion image.

First in S401 through S404, carried out is the process for searching and reading the maximum and minimum values of each of the X and Y coordinates of the motorized stage 20 from the microscope information exemplified in FIG. 3.

Figure 5:
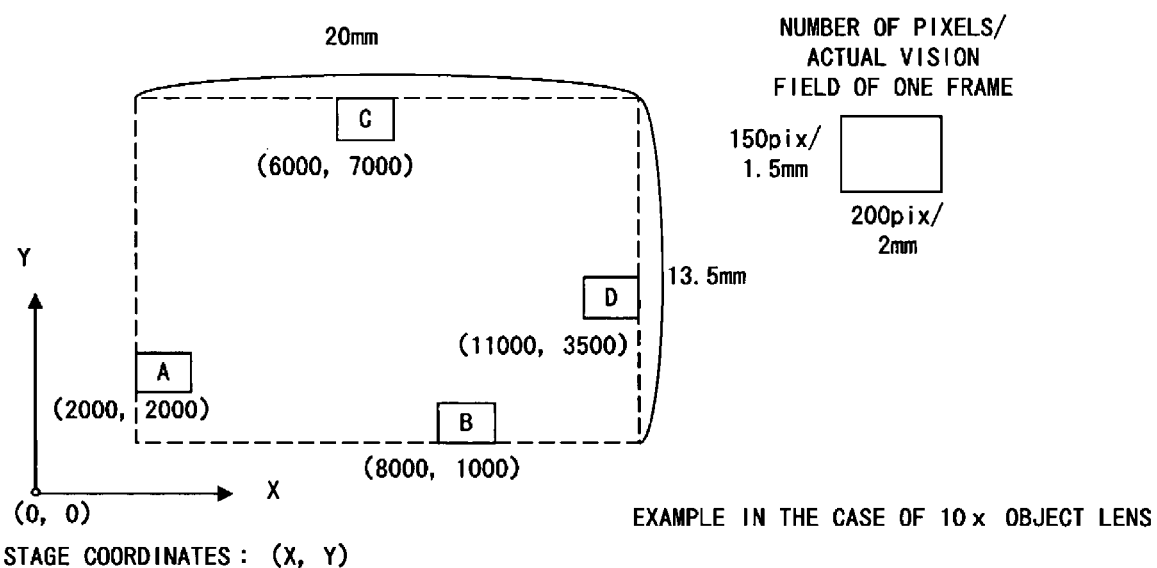
FIG. 5 is a diagram exemplifying a position relationship of image pickup zone of microscopic images constituting a motion image of a specimen.

The next description here is on FIG. 5 that exemplifies a position relationship of image pickup zones of microscopic images constituting a motion image of the specimen 19.

Referring to FIG. 5, designating a position coordinate of the motorized stage 20 as the origin position (X,Y)=(0, 0), the value of the X-and Y-coordinates increase as the position moves rightward and upward according to the delineation of the drawing.

In the example shown in FIG. 5, a microscopic image picked up at a position where the X coordinate is the maximum is "D", with the X coordinate being 11000. And a microscopic image picked up at a position where the Y coordinate is the maximum is "C", a microscopic image picked up at a position where the X coordinate is the minimum is "A" and a microscopic image picked up at a position where the Y coordinate is the minimum is "B".

Now the description returns to FIG. 4.

In S405, carried out is the process for reading information of a magnification ratio of a microscopic image by searching it from the microscope information exemplified in FIG. 3. In the subsequent S406, carried out is the process for reading information indicating a relationship of the number of pixels in one frame of the video camera 3 with an actual field of vision by searching it from an auxiliary storage apparatus of the host system 2 prerecording the aforementioned information. Then carried out in S407 is the process for calculating a size of an outer circumferential frame of a wide image that will be created in a later process.

The next is a description on a calculation of a size of an outer circumferential frame of the wide image by referring to the example shown in FIG. 5.

First is to calculate a difference between the maximum and minimum of each of the X-and Y-coordinates indicating a position of the motorized stage 20 at the time of picking up the individual microscopic images constituting a motion image. In the example shown in FIG. 5, this results in:

$X$ coordinate: 11000−2000=9000

$Y$ coordinate: 7000−1000=6000

This calculation result expresses a changing range of coordinates of the motorized stage 20 at the time of picking up image of a motion image.

The next converts the changing range of coordinates of the motorized stage 20 into an actual range of movement. As an example, where a resolution of a movement of the motorized stage 20 in the X-Y plane is assumed to be 2 micrometers, the conversion results in:

X direction movement range:

9000×2 micrometers=18000 micrometers

Y direction movement range:

6000×2 micrometers=12000 micrometers

The next calculates a size of an actual field of vision of an observation zone for one frame of the microscopic image. As an example, where an actual vision field zone of 1.5 mm by 2 mm is image-picked up by a video camera 3 of which the number of pixels in one frame is assumed to be 150 by 200 pixels as a result of using a 10× object lens 23 (and assuming an imaging zone for each pixel being 10 micrometers by 10 micrometers), resulting in:

X direction actual vision field size:

18000 micrometers+2.0 mm=20.0 mm

Y direction actual vision field size:

12000 micrometers+1.5 mm=13.5 mm

Therefore, a wide image frame is equivalent to an actual vision field zone of a 20.0 mm by 13.5 mm. Here, a display zone for each pixel is 10 micrometers and therefore the number of pixels required for displaying the entirety of the actual vision field zone is:

(20.0 [mm]×100 [pixels]) by (13.5 [mm]×100 [pixels])=2000 pixels by 1350 pixels

That is, an image zone equivalent to a 2000 by 1350 pixels is provided for creating a wide image, and therefore the outer circumferential frame of the wide image is a size enclosing the image zone.

Now the description returns to FIG. 4.

In S408, carried out is a placement process for placing and fitting the individual microscopic image constituting a motion image of the specimen 19 in a position of an image zone, of a wide image, corresponding to the X and Y coordinates of the motorized stage 20 at the time of obtaining the aforementioned microscopic image.

Note that the placement process of the microscopic image is carried out in a time sequence of the microscopic images lined up in a time series in the data of the motion image. Here, when fitting a microscopic image by superimposing it on an image zone of a wide image, the fitting is carried out by overwriting a microscopic image that is fitted later in the present image zone. Note that a configuration may be in a manner to perform an adjustment for evening out brightness in each microscopic image.

In S409, carried out is the process for judging whether or not the fitting process of the S408 has been completed for all microscopic images constituting the motion image. Here, if the judgment is that all the fitting process is complete (i.e., the judgment result is "yes"), the process proceeds to S410. Contrarily, if the judgment is that a microscopic image is left out of the fitting process (i.e., the judgment result is "no"), the process returns to the S408 for repeating the fitting process.

In S410, carried out is the process for recording and storing data of a wide image created as described above in the data recording unit 4, followed by returning the process to FIG. 2.

Such is the wide image creation process.

FIGS. 6A and 6B show a relationship between an observation zone of the specimen 19 and a wide image.

FIG. 6A is an illustration diagram exemplifying the entirety of the specimen 19 and a locus when the motorized stage 20 is moved while recording the specimen as a motion image. A plurality of rectangles drawn in FIG. 6A is a frame indicating the individual imaging zone of the video camera 3. In this example, an observation of the specimen 19 is started at the start position near the left bottom corner and the motorized stage 20 is moved upward, rightward and right bottomward until the observation is complete at the position.

Comparably, FIG. 6B exemplifies a wide image created from the motion image. Note that the configuration is such that a part of an image zone in which a microscopic image is not included in the motion image, of an image zone within the frame of the wide image calculated by the process of FIG. 5, is placed, and embedded, with a prescribed image such as a mosaic in the display as shown in FIG. 6B.

The host system 2 carrying out the process described above results in obtaining a microscopic image in a screening for the specimen 19 and generating a motion image, and further generating a wide image, which has a field of vision wider than the microscopic images constituting the aforementioned motion image, of the specimen 19, from the aforementioned motion image.

Then the user of the microscope system shown in FIG. 1 refers to the motion image and wide image of the specimen 19 obtained as described above, search a point desired for a minute observation from the specimen 19 and carries out a detailed observation by means of various observation methods. In this event, the user picks up image of a point desired to keep in a record by using the video camera 3 and stores it as a still image. The microscopic image, which is obtained by the imaging, of the specimen 19 is named as a "detail observation image" hereinafter.

Note that the microscope system of FIG. 1 is configured to obtain microscope information and record it in the data recording unit 4 at the time of picking up the detail observation image, in the same manner as the time of picking up the above described motion image, so as to enable a later reference of the position (i.e., coordinates) and observation method of the detail observation image.

The next is a description on a browse method of various images recorded in the data recording unit 4 as described above.

Figure 7:
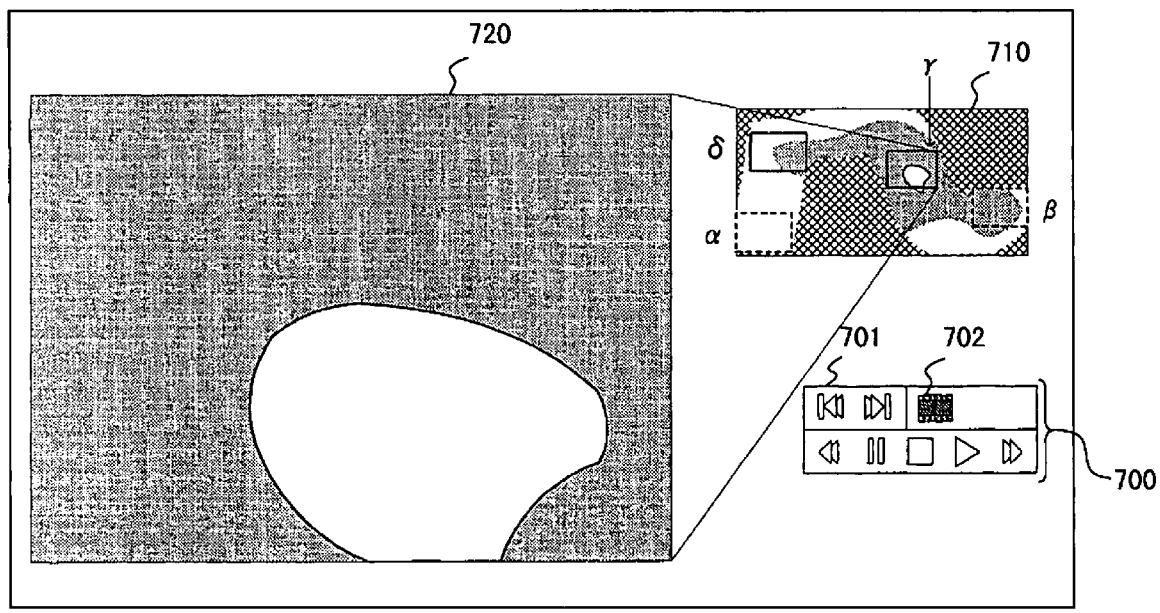
FIG. 7 is a diagram exemplifying an image display screen that a host system makes a monitor display.

FIG. 7 exemplifies an image display screen that the host system 2 makes the monitor 5 display. The screen shown in FIG. 7 is equipped with an operation unit 700, a reference image display unit 710 on the right side of the screen and an enlarged reproduction display unit 720 on the left side of the screen. Here, the operation unit 700 is for the user operating to give various instructions to the microscope system 1. The reference image display unit 710 is a display unit for displaying a reduced image of the above described wide image. The enlarged reproduction display unit 720 is a display unit for displaying a motion image stored in the data recording unit 4 and a partial enlarged image of a reduced wide image displayed in the reference image display unit 710.

Here, the operation unit 700 is furnished with a mode changeover button 702 and a control box 701. The mode changeover button 702 is a button used for changing over the display modes in an image display of the enlarged reproduction display unit 720 between a motion image mode and a synthesis wide image mode. And the control box 701 is equipped with buttons for carrying out various controls (e.g., replay start, frame advance, fast forward, rewind, temporary stop, stop and such) for replaying a motion image when a motion image mode is selected. These various buttons enables a pointing device such as a mouse apparatus (not shown in a drawing herein) for example to operate by a moving operation of an index cursor onto the relevant button and a clicking operation thereat.

The enlarged reproduction display unit 720 displays a motion image stored in the data recording unit 4 when a motion image mode is selected by the mode changeover button 702, and displays the above described wide image when a synthetic wide image mode is selected. Meanwhile, the reference image display unit 710 displays a reduced image that is featured for displaying the entire zone of the above described wide image. Here, a prescribed image, such as a mosaic, is displayed for an image zone for which a microscopic image is not obtained. Furthermore, a frame (i.e., a dotted line frame as delineated in FIG. 7) equivalent to the image pickup zone at the time of observation being displayed between a point (i.e., the a in the drawing), at which an image pickup is started, and a point (i.e., the β in the drawing) at which the image pickup is finished.

As described above, the wide image is created on the basis of the coordinates indicating a position, of the motorized stage 20, recorded at the time of an image pickup of a motion image and on the basis of the size of the frame (i.e., microscopic images) of the motion image. Therefore, a correlation of the individual frame images constituting the motion image with the position and observation zone of the wide image can easily be known. Therefore, the frame is displayed by overlapping in the reference image display unit 710 of FIG. 7 (i.e., they shown in the drawing) when the motion image mode is selected by the mode changeover button 702. This frame is for indicating as to which position and zone of the wide image displayed in the reference image display unit 710 the motion image frame (i.e., a microscopic image) replay-displayed in the enlarged reproduction display unit 720 has been picked up. That is, a pressing operation of a button of the control box 701 displays the stored motion image in the enlarged reproduction display unit 720 and also displays the frame indicating the image-pickup position of the motion image frame that is displayed in the enlarged reproduction display unit 720. Then, the position of the frame changes second by second in accordance with a progress of the motion image in the enlarged reproduction display unit 720. Note that the frame is displayed in an aspect (i.e., a solid line frame in the showing of FIG. 7) that is distinguishable from the image pickup start point and image pickup finish point of the motion image.

And, if an image of the above described detail observation image is picked up, a frame corresponding to the position and zone of the detail observation image is also displayed in a reduced wide image (i.e., the δ shown in FIG. 7) of the reference image display unit 710.

Incidentally, the reference image display unit 710 is configured to allow an instruction for selecting a motion image frame to be displayed in the enlarged reproduction display unit 720. That is, a drag operation of the frame of γ by using a pointer, such as a mouse apparatus, capable of handling it, as shown in FIG. 7, makes it possible to move the frame of γ along the locus of the motorized stage 20 at the time of image pickup of the motion image. And a motion image frame corresponding to the moved frame of γ is displayed in the enlarged reproduction display unit 720. Here, if a click operation is carried out for the frame or the inside of the frame of the α or β, the motion image frames at the start position and end position are respectively displayed in the enlarged reproduction display unit 720. Furthermore, if a click operation is carried out for the frame or the inside of the frame of the δ, the detail observation image stored in the data recording unit 4 is displayed in the enlarged reproduction display unit 720.

Comparably, if the synthetic wide image mode is selected by pressing the mode changeover button 702, a partial image of a wide image corresponding to the frame γ in the reduced wide image displayed in the reference image display unit 710 is displayed in the enlarged reproduction display unit 720. Note that the frame γ of the reference image display unit 710 can be enlarged, reduced and moved by a prescribed operation for a mouse apparatus and such in this event. Here, if the frame γ is reformed or moved, a wide image corresponding to the post-reform or post-movement frame γ is displayed in the enlarged reproduction display unit 720.

Note that the motion image, wide image, detail observation image and microscope information are recorded together as one group of data in the data recording unit 4 to be readied for a replay of a state at the time of observation at any time upon readout by using a prescribed application.

As described above, the present embodiment is configured to pick up image of an observation image of the specimen 19 as a motion image and create a wide image thereof from the motion image, thereby making it possible to grasp the overall image of the specimen 19 quickly without needing a specific preprocess. It is also configured to keep, as a record, an observation path traced by the observer at the time of observing the specimen 19, thereby making it easy to investigate or examine after the observation.

Figure 8:
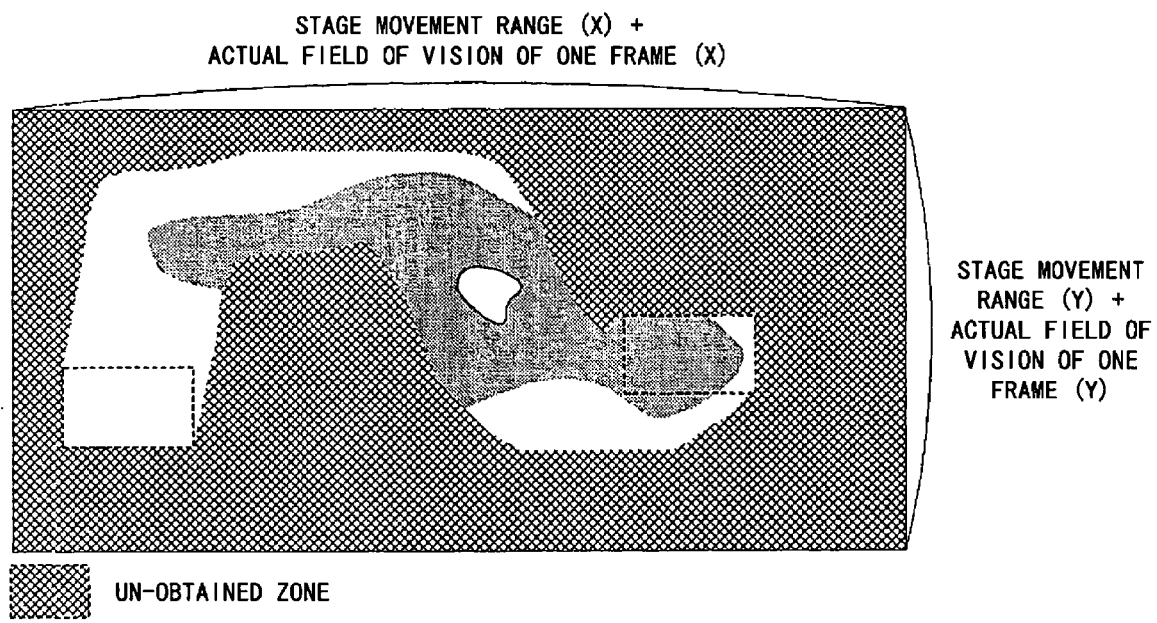
FIG. 8 is a diagram exemplifying a setup of an outer circumference frame of a wide image to a size corresponding to a moving range of a motorized stage.

Note that the present embodiment is configured to calculate a size of the outer circumferential frame of a wide image based on the X-and Y coordinates, which is included in the obtained microscope information, indicating a position of the motorized stage 20. An alternative configuration may be in a manner to preset a movement range of the motorized stage 20 so that a size of the frame of a wide image is set to a size (i.e., a sum of a movement range of the motorized stage 20 and a field of vision of a motion image frame) corresponding to the movement range as exemplified in FIG. 8.

Also, the present embodiment is configured to equip the microscope apparatus 1 with the motorized stage 20, which is motor driven, as a stage for placing the specimen 19. An alternative configuration may be in a manner to equip the microscope apparatus 1 with a common manual type stage. In such a case, a comprisal for detecting coordinates indicating a position of the stage is required. Such a comprisal includes a rotary encoder equipped in a handle unit, in place of a joy stick or button, which is operated for driving the stage. Or, the moving part of the stage may be equipped with a linear encoder.

Also, the present embodiment is configured to display the overall area of a created wide image in the reference image display unit 710 by reducing the image. Instead, a limited zone of the wide image may be selectively displayed by the reference image display unit 710. Such a configuration makes it possible to avoid a situation in which a frame y becomes very small, making very difficult to discern the position, in the case of a zone of a created wide image being extremely larger than an image pickup zone of a single motion image frame.

Also, the present embodiment is configured to provide an image zone for a wide image that is enough for satisfying a movement zone of the motorized stage 20 without reducing an image size of a motion image frame. An alternative configuration may be in a manner to pre-reduce a frame size in a prescribed reduction ratio when calculating a size of the frame of a wide image and reduce an image size of a motion image frame matching with the reduced image size, followed by sticking it within the frame of the wide image. Such a configuration makes it possible to make a data volume of the wide image compact.

Also, the present embodiment is configured to display a prescribed image, such as a mosaic, in a zone of a wide image, in which an observation image is not picked up. An alternative configuration may be in a manner to display a still image of the entirety of the specimen 19 that is pre-imaged by a smaller magnification ratio than one at the time of imaging a motion image that is the origin of creating the wide image in a zone in which an observation image is not picked up. In which case, the aforementioned still image is displayed in reduction based on the magnification ratio at the time of imaging it and information of a resolution in order to match with the number of pixels and display zone of a wide image to be created.

As an example, where it has been possible to pick up an observation image (i.e., a still image) of the overall area of the specimen 19 in an observation magnification ratio of 1× and the size of an image recorded then is 1000 by 1500 pixels. Here, assuming that a motion image as the origin of a wide image has been imaged by the image size of 100 by 150 pixels at a 20× magnification ratio, an image size of 2000 by 3000 pixels is required for satisfying the image pickup zone at a resolution of the motion image and in the observation magnification ratio of 1×. Therefore, the still image needs to be expanded to a 2× in order to match the aforementioned still image that is imaged by the observation magnification ratio of 1× with the size of the wide image in this event.

Embodiment 2

The characteristic of the present embodiment lies in equipping the host system 2 according to the embodiment 2 with a telecommunication unit (sometimes abbreviated as "telecom" unit hereinafter) capable of telecommunicating externally, thereby enabling a transmission of an observation image of the specimen 19 to a remote location and also an operation of the microscope apparatus 1 from the aforementioned remote location.

Figure 9:
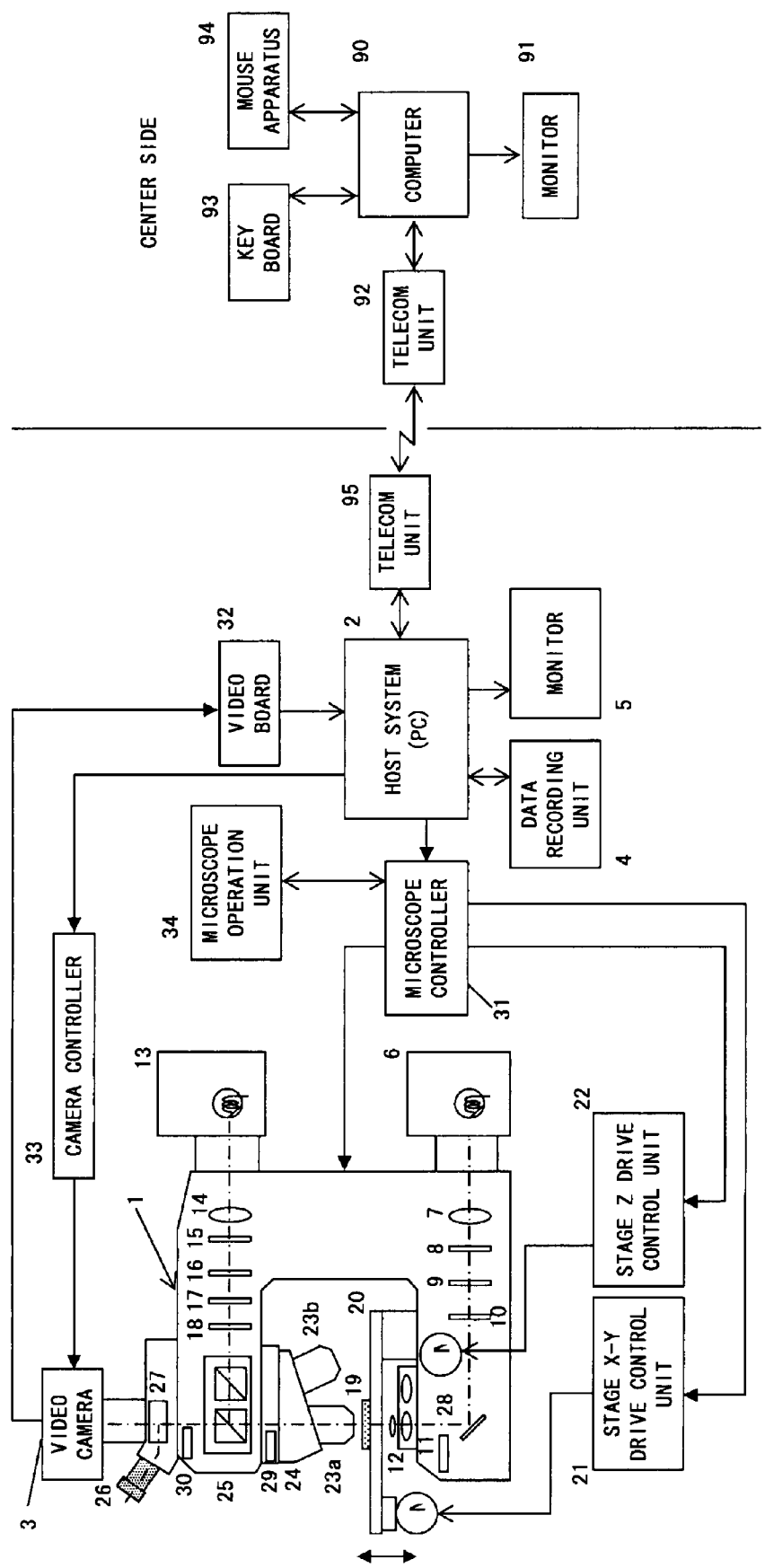
FIG. 9 is a diagram showing a configuration of a microscope system according to an embodiment 2.

FIG. 9 shows a configuration of a microscope system according to the present embodiment. Note that the same component sign is assigned to the same constituent component of the microscope system shown in FIG. 1 in the delineation of FIG. 9 and the description is omitted herein.

Referring to FIG. 9, a telecom unit 95 is connected to the host system 2. An image reception side system (named as "center" hereinafter) is installed in a spot physically and geographically distanced from the installed place of the host system 2. The image reception side system is configured to connect a monitor 91, as a display apparatus, and a key board 93 and mouse apparatus 94, as operation input apparatuses, to a computer 90 of a standard configuration comprising a CPU, memory and such; and further connect a telecom unit 92 similar to the host system 2. Here, the telecom units 92 and 95 connect the host system 2 and computer 90 respectively to the existing telecom network such as a telephone line, optical fiber or such, thereby enabling an exchange of various data between the host system 2 and center side system by way of the telecom network.

The next is a description of an operation of the microscope system.

Also in the microscope system shown in FIG. 9, first a user picks up image of a motion image of a microscope observation image of the specimen 19 while operating a microscope operation unit 34 on the host system 2 side, followed by a wide image of the specimen 19 being created from the obtained motion image. The series of operation is similar to the one according to the above described embodiment 1, which is accomplished by the host system 2 carrying out the control process shown in FIGS. 2 and 4.

Figure 10A:
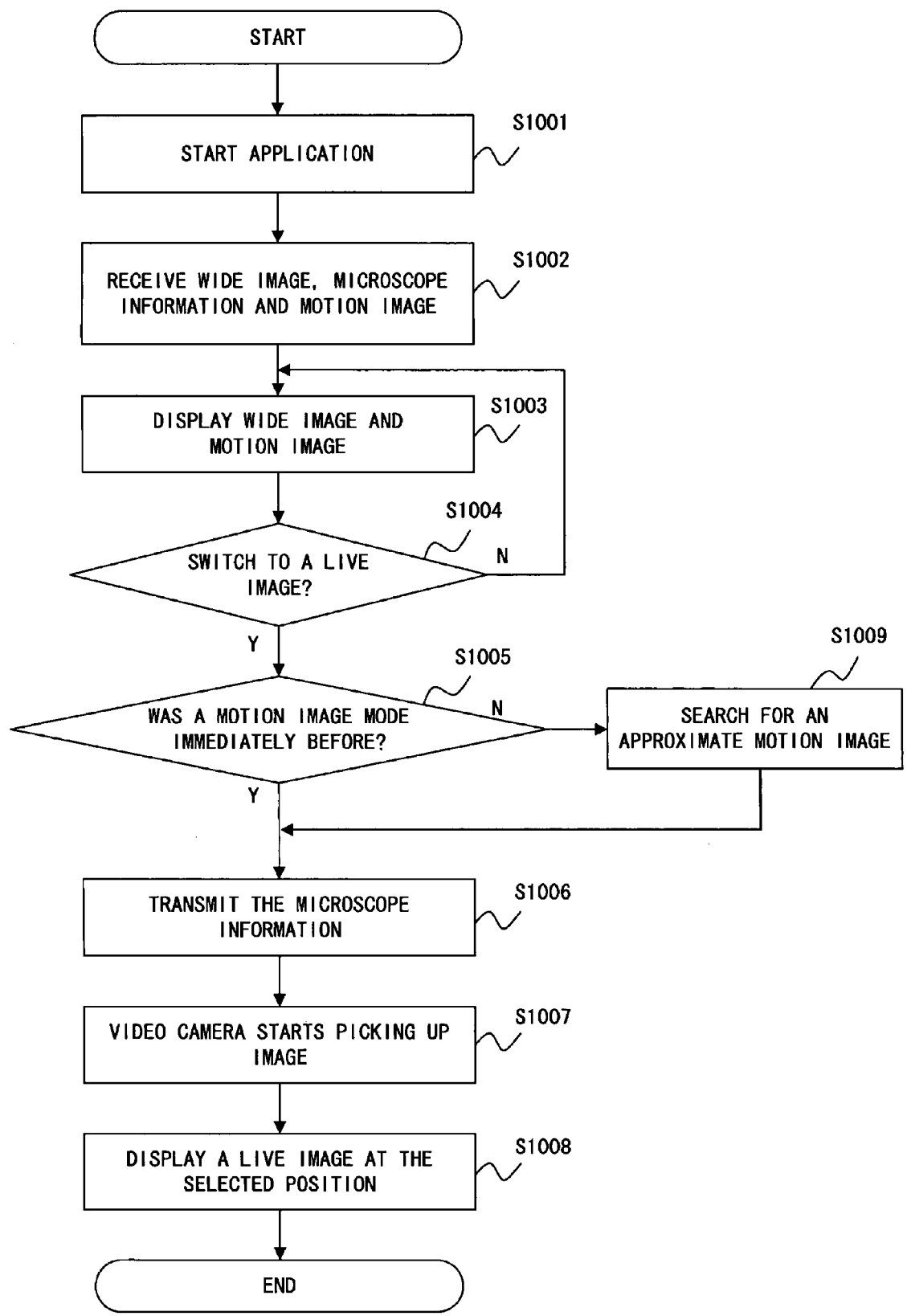
FIG. 10A is a diagram showing a process content of a browse process in a flow chart.

The next is a description of an operation for the center side browsing the wide image and motion image, of the specimen 19, which are obtained as described above. FIG. 10A shows a process content of the browse process in a flow chart; and FIG. 10B shows each process step shown in FIG. 10A being carried out by either of the host system side or center side shown in FIG. 9.

First in S1001, the process for starting up browse-use application software is carried out in the computer 90 on the center side. As the application software is started up, the host system 2, which is a connection destination, and the motion image and wide image of the specimen 19, which is a subject of browsing, are selected and information indicating the selection result is transmitted to the host system 2 from the computer 90 on the center side. Having received the information indicating the selection result, the host system 2 carries out the process for reading motion image data, wide image data and microscope information data of the specimen 19 which are recorded in the data recording unit 4 therefrom and making the telecom unit 95 transmit them.

In S1002, the process for making the telecom unit 92 receive the motion image data, wide image data and microscope information data of the specimen 19 transmitted from the host system 2 side is carried out at the computer 90 on the center side.

In S1003, carried out at the computer 90 on the center side is the process for making the monitor 91 display images (i.e., a microscopic image that is a motion image, and a wide image) expressed by the received data.

FIG. 11 exemplifies a screen example displayed in the monitor 91 as a result of the process of the S1003.

The configuration of the screen of FIG. 11 is similar to the screen shown in FIG. 7, except that the difference lies in being equipped with three buttons, i.e., a motion image mode selection button 1001, a synthetic wide image mode selection button 1002 and a live mode selection button 1003, in place of the mode changeover button 702, as buttons equipped in the operation unit 700 for changing over display modes.

Here, the motion image mode selection button 1001 and synthetic wide image mode selection button 1002 are configured to enable an individual selection of the motion image mode and synthetic wide image mode by separating the mode changeover button 702 comprised in the configuration of FIG. 7. Therefore, the operations at the time of these buttons being pressed for operation are exactly the same as that of the embodiment 1 and the description is accordingly omitted here.

The live mode selection button 1003 is used for selecting a live mode that displays the current live image of the specimen 19 in real time. When this button is pressed for operation, an image of the specimen 19 that is being imaged by the video camera 3 is displayed in the enlarged reproduction display unit 720.

The description now returns to FIGS. 10A and 10B.

In S1004, carried out at the computer 90 on the center side is the process for judging whether or not an operation of pressing the live mode selection button 1003 is obtained. Here, if the judgment is that the aforementioned operation is obtained (i.e., the judgment result is "yes"), the process proceeds to S1005. Contrarily, if the judgment is that the aforementioned operation is not obtained (i.e., the judgment result is "no"), the process returns to the S1003 for repeating the above described process.

In S1005, carried out at the computer 90 on the center side is the process for judging whether or not a display mode immediately prior to obtaining the operation of pressing the live mode selection button 1003 was the motion image mode. Here, if the judgment is that the display mode then was the motion image mode (i.e., the judgment result is "yes"), the microscopic image currently displayed in the enlarged reproduction display unit 720 is regarded as being selected by the observer and the process proceeds to S1006, followed by the process of transmitting the microscope information being carried out at the computer 90 on the center side.

In the process of the S1006, the first is to detect a frame number of the motion image frame currently displayed in the enlarged reproduction display unit 720. The next extracts a piece of information corresponding to the frame number from the microscope information received in the process of the S1002. The next makes the telecom unit 92 transmit the extracted microscope information to the host system 2 side. Upon finishing the process of the S1006, the process proceeds to S1007.

Contrarily, if the judgment of the S1005 is that the display mode then was the synthetic wide image mode (i.e., the judgment result is "no"), the process for searching an approximate motion image frame is carried out at the computer 90 on the center side in S1009.

The process of the S1009 is one for searching a motion image frame expressing an image zone that is the closest position to the center position in a partial zone display of the wide image currently displayed in the enlarged reproduction display unit 720. Now, let it be assumed that the wide image is displayed in the enlarged reproduction display unit 720 and that images A, B and C exist as a motion image frame as the origin of the wide image as shown in FIG. 11. In this case, the image B, that is, the distance between the center point (i.e., the "+" mark in the drawing) of the zone displayed in the enlarged reproduction display unit 720 and the center point of the motion image frame is the shortest is selected.

In the S1006 following the S1009, the process for transmitting the microscope information is carried out at the computer 90 on the center side. That is, it first detects a frame number of the thusly selected motion image frame, then extracts a piece of microscope information corresponding to the frame number from the microscope information received by the process of the S1002 and makes the telecom unit 92 transmit the extracted piece of the microscope information to the host system 2 side.

In S1007, carried out at the host system 2 is the process for making the video camera 3 start picking up observation image of the specimen 19. Note that the observation state of the microscope apparatus 1 at the time replays the contents indicated in the microscope information transmitted from the center side by the process of the S1006, i.e., the X, Y, Z coordinates values of the motorized stage 20, the magnification ratio of the microscopic image, the light volume of the illumination light and the observation method (i.e., the microscopy). The replay of the observation state is accomplished by the host system 2 setting the observation state in the microscope apparatus 1 by controlling the microscope controller 31.

In S1008, carried out at the host system 2 is the process for making the telecom unit 95 transmit image data expressing the motion image picked up by the video camera 3. Over at the computer 90 on the center side, carried out is the process for making the telecom unit 92 receive the image data and making the monitor 91 display an image expressed by the received image data in the enlarged reproduction display unit 720 of the display screen.

As described above, the present embodiment is configured to add, to the system according to the embodiment 1, the center side system that is configured to enable an exchange of data by way of the existing telecom network. Such a configuration makes it possible to grasp the entire image of the specimen 19 based on the already recorded image without having the entire area of the specimen 19 scanned by an instruction from the center side system in the so-called telepathology, thereby enabling a speedy diagnosis.

Note that the present embodiment is configured to transmit microscope information of a motion image frame closest to the image zone of the wide image currently displayed in the enlarged reproduction display unit 720, thereby replaying the observation state of the microscope apparatus 1 when changing the display modes from one other than the motion image mode (i.e., the synthetic wide image mode) to the live mode. An alternative configuration may be in a manner to obtain an X and Y coordinates of the motorized stage 20 corresponding to the motion image frame by calculating XY coordinates so that the center of the currently displayed wide image in enlargement matches with the center position of a motion image frame image to be displayed as a live image. And it may be configured to transmit the calculated coordinates to the host system 2 from the center side and move the motorized stage 20 to a position indicated by the coordinates.

As described above, either embodiment of the present invention makes it possible to record an observation state of the microscope apparatus 1 at the time of a user discretionarily observing the specimen 19 in the microscope apparatus 1 by correlating with an observation image of the specimen 19 and create a wide image enabling a grasp of the entire image of the specimen 19 based on the aforementioned record. The configuration therefore enables the replay work and discovery work of a detail observation point to be more effective, thereby making it possible to improve a work speed and lighten the work load of the worker greatly.

Such is the description of each embodiment of the present invention; it can be, however, improved and/or changed in various manners possible within the scope of the present invention, in lieu of being limited to either of the above described embodiments.

What is claimed is:

1. A microscope system, comprising:
    an obtainment unit for obtaining microscopic images in a time series obtained by picking up images of discretionary portions of a specimen and also obtaining microscope information which is correlated with each of the microscopic images and which indicates an observation state of a microscope when each respective microscopic image has been picked up; and
    an image synthesis unit for synthesizing the microscopic images in a time series obtained by picking up the images of the discretionary portions based on position information which is included in the microscope information and which indicate positions of the specimen when each respective microscopic image has been picked up, thereby synthesizing a wide view image that is wider than each individual microscopic image;
    wherein the image synthesis unit comprises:
        a calculation unit for calculating a size of an outer circumference frame of the wide view image based on the position information correlated with each of the microscopic images in a time series obtained by picking up images of the discretionary portions; and
        an image placement unit for placing each of the microscopic images in a time series within the outer circumference frame based on the position information correlated with each respective microscopic image.

2. The microscope system according to claim 1, further comprising a stage for placing the specimen, wherein the position information comprises coordinate information indicating a position of the stage.

3. The microscope system according to claim 1, wherein the image synthesis unit places and embeds a prescribed image in a blank part within the wide view image after a placement by the image placement unit.

4. The microscope system according to claim 1, further comprising a display unit for displaying the microscopic images and the wide view image together.

5. The microscope system according to claim 4, wherein a framework indicating an image pickup position of a microscopic image is indicated on the wide view image displayed by the display unit.

6. The microscope system according to claim 4, wherein the microscope system comprises a host system and a center system,
    wherein the host system comprises the microscope, the obtainment unit and the image synthesis unit,
    wherein the center system comprises the display unit, and
    wherein the microscope system further comprises a telecommunication unit for exchanging various data between the host system and center system by way of a telecommunication network, wherein the display unit displays the microscopic images and the wide view image which are transmitted from the host system by way of the telecommunication network.

7. The microscope system according to claim 6, wherein the telecommunication unit sends the microscope information correlated with each of the microscopic images to the center system from the host system and also sends the microscope information correlated with a microscopic image selected from the microscopic images in the center system to the host system from the center system, and wherein the host system further comprises a microscope control unit for controlling the microscope to reproduce an observation state indicated by microscope information sent from the center system by controlling the microscope.

8. The microscope system according to claim 7, wherein the host system further comprises a search unit for selecting a microscopic image corresponding to a zone related to a selection of a zone by searching from among the microscopic images in accordance with an instruction for selecting the zone of the wide view image displayed by the display unit, wherein the telecommunication unit sends the microscope information correlated with a microscopic image selected by the search unit to the host system from the center system.

9. A method for synthesizing microscopic images, comprising:

obtaining microscopic images in a time series obtained by picking up images of discretionary portions of a specimen and also obtaining microscope information which is correlated with each of the microscopic images and which indicates an observation state of a microscope when each respective microscopic image has been picked up; and synthesizing the microscopic images in a time series obtained by picking up the images of the discretionary portions based on position information which is included in the microscope information and which indicate positions of the specimen when each respective microscopic image has been picked up, thereby synthesizing a wide view image that is wider than each individual microscopic image, wherein the synthesizing comprises:

calculating a size of an outer circumference frame of the wide view image based on the position information correlated with each of the microscopic images in a time series obtained by picking up images of the discretionary portions; and placing each of the microscopic images in a time series within the outer circumference frame based on the position information correlated with each respective microscopic image.

10. A non-transitory computer readable recording medium having stored thereon a program for controlling a computer to synthesize microscopic images, wherein the program is executable by the computer to perform processes comprising:

obtaining microscopic images in a time series obtained by picking up images of discretionary portions of a specimen and also obtaining microscope information which is correlated with each of the microscopic images and which indicates an observation state of a microscope when each respective microscopic image has been picked up; and synthesizing the microscopic images in a time series obtained by picking up the images of the discretionary portions based on position information which is included in the microscope information and which indicate positions of the specimen when each respective microscopic image has been picked up, thereby synthesizing a wide view image that is wider than each individual microscopic image, wherein the synthesizing comprises:

calculating a size of an outer circumference frame of the wide view image based on the position information correlated with each of the microscopic images in a time series obtained by picking up images of the discretionary portions; and placing each of the microscopic images in a time series within the outer circumference frame based on the position information correlated with each respective microscopic image.

* * * * *